United States Patent [19]

Schloemann

[11] 3,965,478

[45] June 22, 1976

[54] MULTICOLOR MAGNETOGRAPHIC PRINTING SYSTEM

[75] Inventor: Ernst F. R. A. Schloemann, Weston, Mass.

[73] Assignee: Raytheon Company, Lexington, Mass.

[22] Filed: Dec. 9, 1974

[21] Appl. No.: 530,627

Related U.S. Application Data

[63] Continuation of Ser. No. 372,142, June 22, 1973, abandoned.

[52] U.S. Cl. .................................. 346/74.1; 360/56

[51] Int. Cl.² ................... G01D 15/12; G01D 15/20

[58] Field of Search ............... 346/74.1; 360/56, 59; 178/30; 358/80

[56] References Cited

UNITED STATES PATENTS

| | | | |
|---|---|---|---|
| 2,961,649 | 11/1960 | Eldredge et al. | 346/74.1 |
| 3,512,169 | 5/1970 | Trimble | 346/74.1 |
| 3,613,100 | 10/1971 | Kaufer | 346/74.1 |
| 3,665,484 | 5/1972 | Foster | 346/74.1 |
| 3,757,353 | 9/1973 | Jeffers | 346/74.1 |
| 3,781,903 | 12/1973 | Jeffers et al. | 346/74.1 |
| 3,804,511 | 4/1974 | Rait et al. | 346/74.1 |
| 3,823,406 | 7/1974 | Jeffers | 346/74.1 |
| 3,824,601 | 7/1974 | Garland et al. | 346/74.1 |

*Primary Examiner*—Alfred H. Eddleman
*Attorney, Agent, or Firm*—John R. Inge; Joseph D. Pannone; Milton D. Bartlett

[57] ABSTRACT

A multicolor magnetographic printing system wherein a magnetizable surface is recorded upon with a different recording wavelength for each color to be printed. Toner is supplied which includes a mixture of different types of particles, each having a different color. The differently colored particles each maximally adhere only to areas on the surface recorded at a wavelength specific for the particular particle type. The toner particles are varied in magnetic susceptibility as well as linear dimensions so as to adjust their maximum adherence for the particularly matched wavelength. Such a system may further include an image enhancement system to ensure that the proper toner particles are concentrated in the appropriate areas. The toner is transferred to a paper surface by both preheating the paper before transfer and heating it afterwards to fix the toner onto the paper surface.

30 Claims, 6 Drawing Figures

MULTICOLOR MAGNETOGRAPHIC PRINTING SYSTEM

CROSS-REFERENCE TO RELATED CASES

This is a continuation of application Ser. No. 372,142, filed June 22, 1973, now abandoned.

BACKGROUND OF THE INVENTION

In the past, when it was desired to obtain a printed copy of a computer output or output from data transmission devices, such as Teletypes, it was the practice to employ electromechanical printers. These printers typically have a replica of the character or symbol to be printed on a hammer which is struck against the paper with an inked ribbon between the character or symbol replica and the paper. The output may be printed one character or symbol at a time, as in a Teletype, or an entire line may be printed at once. In either case, the printing rate was severely limited by the inertia of the individual hammers. If the printing speed of such mechanical systems was increased, the complexity and cost of the resulting mechanism were also greatly increased. Magnetic printing systems had subsequently been developed wherein the character patterns to be printed were first magnetized upon a recording surface and a toner was applied to the surface where the particles of the toner were magnetizable and would adhere to the areas which had been previously magnetized.

Frequently it has been desired to use more than a single color for such types of printing. With the above-mentioned electro-mechanical printers, ribbons of different colors had to be provided and the ribbon shifted each time the color was to be changed. Such a requirement often precluded the use of color printing when a whole line of characters was printed at one time since it would be impractical to provide a separate ribbon for each character in the row of characters or to shift the ribbon separately as each separate character in the row was struck. An alternative was to print all the characters of a particular color at one time then to overlay that printing with a printing of all the characters of the second color. Registration problems were thus inherent between characters of different colors. In magnetographic printing systems, as in the present invention, it is not necessary to use a ribbon and hence not necessary to provide a mechanism for shifting that ribbon.

SUMMARY OF THE INVENTION

A magnetizable surface with some finite thickness which will retain some permanent magnetization without continuous application of an external magnetic field is magnetized with the desired character or symbol images. The images are produced by patterns of small adjacent areas where the direction of magnetization alternates between adjacent areas. The length over which the direction of magnetization completes one cycle, the recording wavelength, is varied depending upon the color desired for the particular area. Areas of the surface which do not carry any image are given a uniform magnetization.

A different toner particle type is provided for each color. The size, internal structure, and magnetic permeability of a toner particle is chosen so that the particle is subjected to a maximum attractive force only at a particular recording wavelength.

A magnetically permeable material makes the particles magnetically attractable. This material is not permanently magnetizable. Pigmented thermoplastic material contained in each particle gives the toner its color. The thermoplastic material may either be layered in the form of a shell over or within the magnetically permeable material or the two may be formed into a homogeneous particle.

In an operative printing system, a row of recording heads magnetizes a recording belt or drum with the desired characters or symbols with the appropriate recording wavelength for the color desired. A mixture of all toner types is applied uniformly to the recording surface. An optional ultrasonic image enhancement section dislodges toner particles which do not lie in appropriate surface areas and reflects them back towards the surface at random angles thereby increasing the probability that a particle will lie in an appropriate area as the process is repeated. Excess toner particles which do not lie in appropriate areas are removed from the surface by gravity and an ultrasonic cleaner. The toner which is properly deposited is then transferred to the paper surface by pressing the recording surface and paper together. The paper may be preheated and a permanent magnet may be provided to facilitate the transfer. The paper and toner are then heated to the melting temperature of the toner to fuse the toner into the paper.

DESCRIPTION OF THE PREFERRED EMBODIMENT

Figure 1:
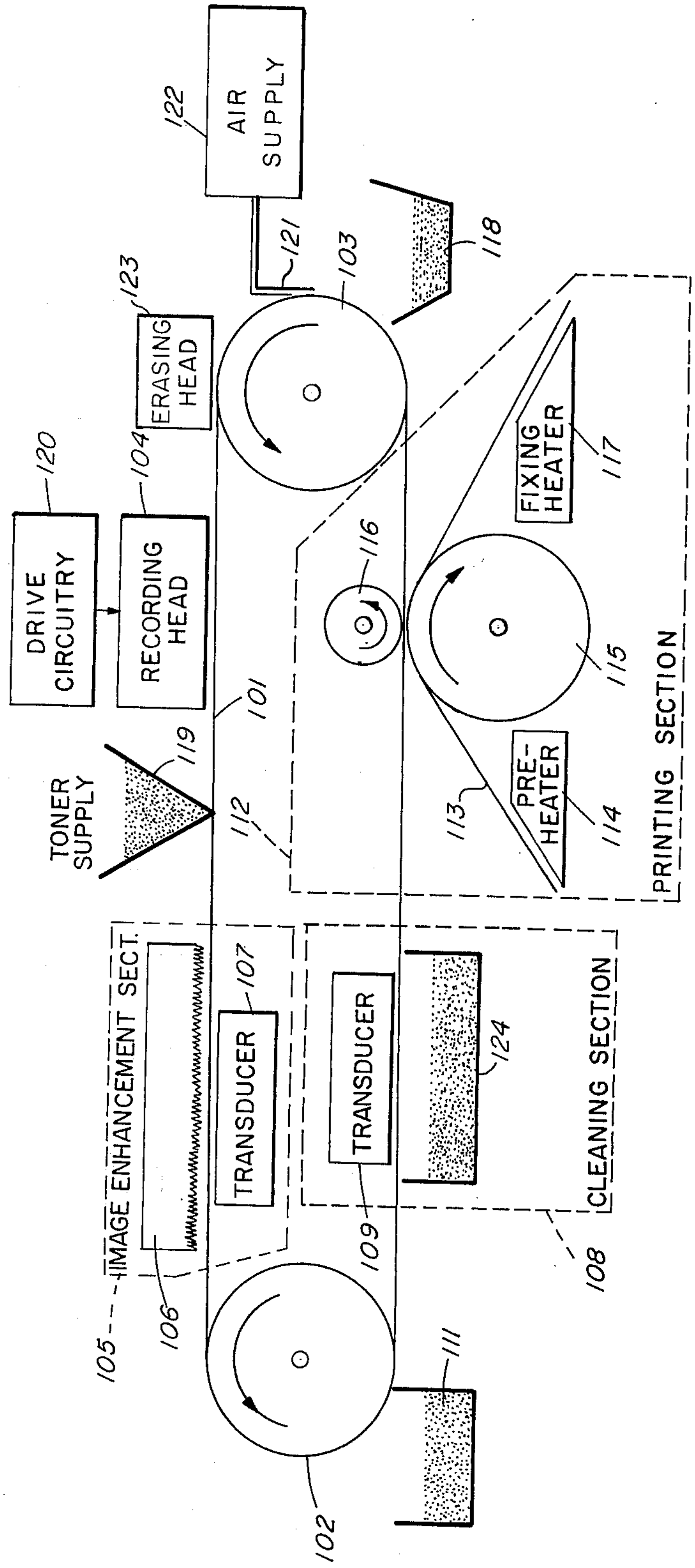
FIG. 1 is a diagrammatical illustration of a magnetic printing system constructed in accordance with the teachings of the present invention.

In FIG. 1 is shown a magnetographic printing system which is constructed in accordance with the teachings of the present invention. A magnetizable recording belt 101 is looped around cylindrical drums 102 and 103. Rotational power is applied to either one of these from a motor (not shown) at such torque levels as to provide a constant belt speed. An erasing head 123 magnetizes the belt 101 in a uniform direction and with uniform magnetic field strength prior to the belt being recorded upon with character and symbol patterns. The toner particles, which are magnetically susceptible, do not adhere to a uniformly magnetized recording surface to any great degree. Recording heads 104 magnetize belt 101 with the appropriate character patterns. Recording head stack 104 consists of a row of recording heads, one for each character in the row of characters to be magnetized onto the recording belt 101 and then transferred to the paper surface. Drive circuitry 120 provides signals to the individual recording heads so that as the belt is moved past recording heads 104 the character patterns are magnetized onto the surface of belt 101. For each color used, a different recording frequency is used so that twice the length of the small areas which make up the character patterns, which length is called the recording wavelength, is adjusted to match the toner particle characteristics. A separate toner particle type is supplied for each recording wavelength and each corresponding color. For example, the black toner particles will adhere only to areas in character patterns which have been recorded using the wavelength matched for the black toner particles while the red toner particles will adhere only to character patterns in which the wavelength has been matched for the red particles. Many different colors may be used other than just these two and more than two colors may be used at one time.

Toner supply 119 is a bin which contains a uniform mixture of all of the desired toner types. Toner supply 119 deposits a uniform layer of the toner mixture on the recorded surface of recording belt 101 as the belt passes underneath the outlet of the bin.

After the toner has been deposited, image enhancement section 105 operates upon recording belt 101 and deposited toner concentrating the appropriate toner types in the desired color areas. Ultrasonic transducer 107 produces ultrasonic sound of sufficient energy to dislodge toner particles from the surface of recording belt 101 which do not lie in the appropriate color areas and hence which are not subjected to the maximum attractive force. The energy is selected to be small enough that it will not dislodge toner particles which already lie in appropriate areas. This is possible since the adherence of toner particles to the surface of the recording belt 101 only reaches its maximum in areas where the wavelength matches the preselected characteristics of the toner particles. Plate 106 has a lower roughened surface which is located opposite ultrasonic transducer 107 on the same side of the recording belt 101 as which the toner is deposited. When toner particles are dislodged from undesired areas, they are reflected from plate 106 at random angles back towards the surface of recording belt 101. Toner particles will tend to concentrate in the appropriate areas as the recording belt 101 passes further through the image enhancement section 105.

The next step in the recording and printing process is to remove excess toner which is not located in recorded areas. As the belt passes around drum 102, most of the excess toner drops off the recording belt 101 by the force of gravity and is collected in bin 111. That which is not removed by gravity will be removed in cleaning section 108. An ultrasonic transducer 109, similar to transducer 107, provides sufficient ultrasonic energy to dislodge toner particles which are not situated in a magnetized area but insufficient energy to dislodge particles which are properly located. These excess particles will be pulled down by the force of gravity and will be collected in bin 124. The excess toner so collected in bins 111 and 124 may be conveyed back to the toner supply 119 through an optional conveyer belt arrangement which is not shown in the present figure.

After the excess toner has been removed, the character images are ready to be transferred to the paper roll 113. As the toners preferably consist at least in part of a pigmented thermoplastic material, it is desirable to preheat the paper before the paper and recording belt 101 are pressed together to soften the toner so that it may better adhere to the surface of the paper 113. Accordingly, a preheater 114 is provided which heats the paper 113 as it comes from the main paper supply. The transfer of the toner from recording belt 101 to paper 113 is effected as the two are pressed together between rollers 116 and 115. Additionally, a permanent magnet may be located directly beneath the surface of the roller 115 so as to provide a further attractive force to move the toner from the recording belt 101 to paper 113. After the toner has been deposited upon the paper surface 113, the fixing heater 117 raises the temperature of the paper and toner sufficiently high to cause the toner particles to melt, fuse, and further adhere to the surface of paper 113.

Before the belt passes completely around drum 103 back to erasing head 123 an air knife 121, supplied with air pressure by air supply 122, removes any toner from the surface of recording belt 101 which was not transferred to the paper 113. This excess toner is collected in bin 118. This toner should be discarded rather than recycled to the toner supply 119 as it consists of fused particles which would be inappropriate for further recording.

Figure 2:
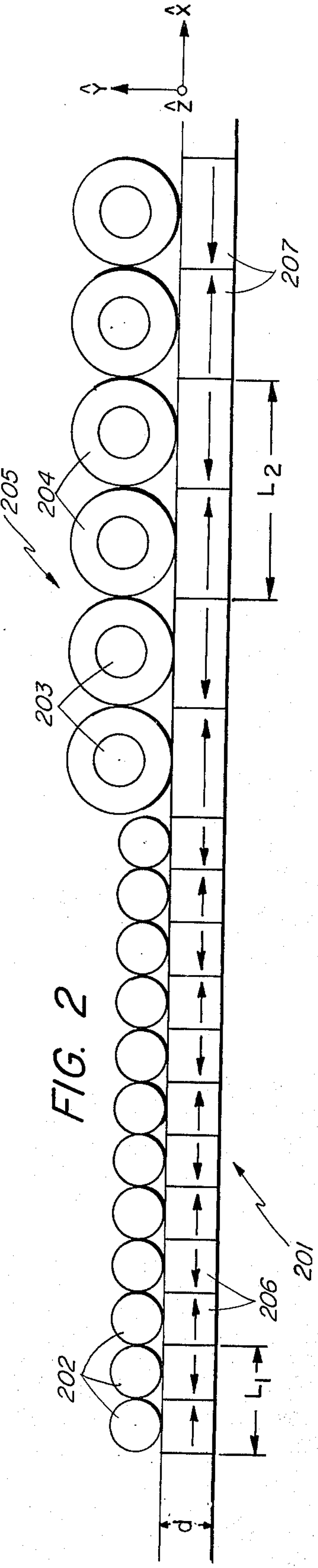
FIG. 2 is a cross-sectional view of two different types of toner particles adhering to different portions of a magnetizable recording surface.

In FIG. 2 is shown a cross-sectional view of two types of toner particles as they adhere to a recording surface recorded at two different recording wavelengths. The smaller particles 202 consist of a substantially homogeneous mixture of a magnetically susceptible material attract primarily a smaller pigment bearing thermoplastic material. The thermoplastic material will melt and fuse upon exposure to a sufficiently high temperature and will become impregnated into a paper surface. The second and larger toner particle type 205 has an outer non-magnetizable shell 204 which consists solely of color bearing thermoplastic material and a magnetizable inner core 203. Of course, the color of the pigment in the two types of particles is different to produce two separate colors. The recording belt 201, with thickness D of its permanently magnetized portion, is recorded at two different recording wavelengths. The areas recorded at recording wavelength $L_1$ attractprimarily the smller toner particles 202 while areas 207, which are magnetized at the longer recording wavelength $L_2$ attract primarily the larger toner particles 205.

Figure 3A:
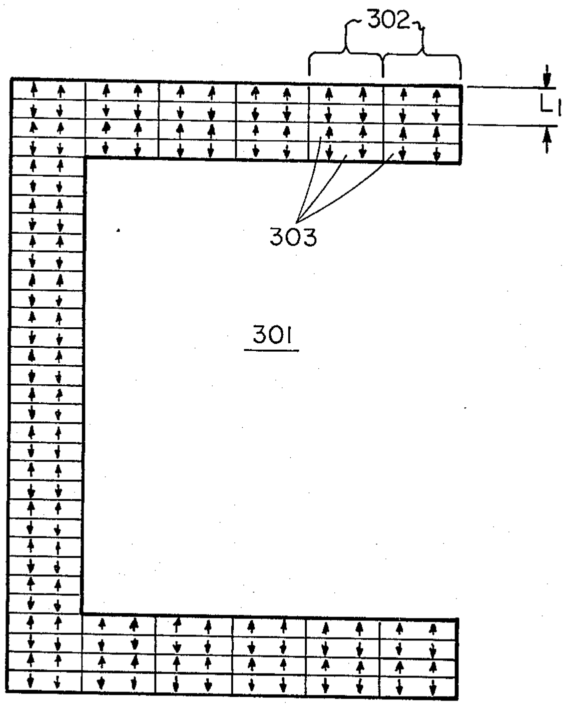
FIGS. 3A and 3B are plan views of magnetization patterns of a character image at two different recording wavelengths.
Figure 3B:
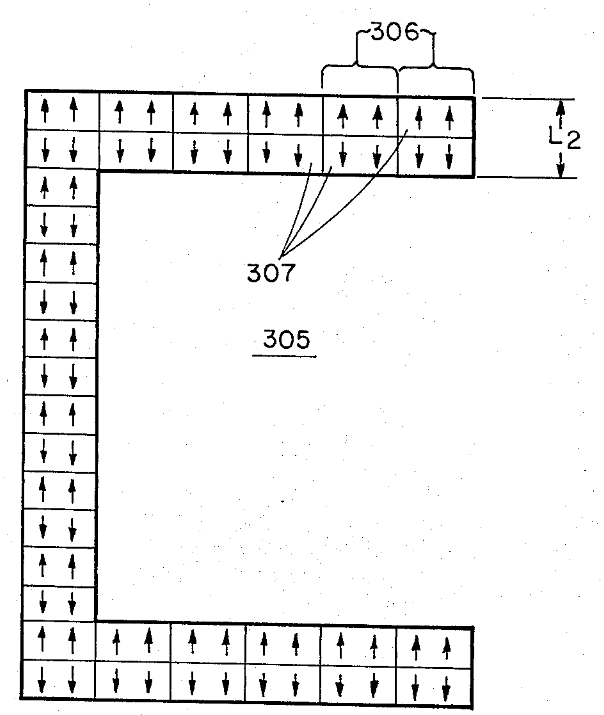

In FIGS. 3A and 3B are shown the magnetization patterns for the letter "C" for two different recording wavelengths, $L_1$ and $L_2$ respectively. The characters are formed from columns 302 and 306 of magnetized areas in which the direction of magnetization alternates between adjacent magnetized areas 303 and 307. Columns 302 and 306 each correspond in width to the width of one track of a recording head. Of course, magnetized areas 303 and 307 are shown much larger in FIGS. 3A and 3B than they would ordinarily be in a practical character and the practical character would have many more of such areas. FIGS. 3A and 3B are used only for purposes of illustration of the physical principle involved. Toner particles with a size near that of $L_1/2$ will adhere to the C of FIG. 3A while toner particles with a size near that of $L_2/2$ will adhere to the C of FIG. 3B. If the two toner particle types carry differently colored thermoplastics, either as an outer or inner shell or as a homogeneous mixture with the magnetic material, the two characters will be printed with different colors.

To understand the physical phenomenon which causes the smaller toner particles 202 to be primarily attracted to areas magnetized at the shorter recording wavelength L1, and the larger toner particles 205 to be similarly attracted primarily to areas magnetized at the longer recording wavelength $L_2$, an idealized theoretical calculation of the force on a toner particle will be made. The magnetic fields in the region around the magnetized area can be derived from a scalar magnetic potential $\psi$ which in turn can be derived from the magnetic pole density $\rho$ by the well-known Laplacian relationship:

$$\nabla^2\psi = 4\pi\rho$$

Here, $\psi$ is assumed to be a function only of $x$ and $y$ as the region of like polarity magnetization is assumed to extend to infinity in the $z$ direction. This assumption is useful since the width of a recorded area is normally much less than its length. It is also assumed, for purposes of analysis, that $\rho$ will be uniformly periodic over the region of interest. In that case, $\psi(x,y)$ and $\rho(x)$ can be expressed in terms of a Fourier series:

$$\rho(x) = \sum_k \rho_k e^{ikx}$$

$$\psi(x,y) = \sum_k \psi_k(y) e^{ikx}$$

where $k$ is an integer multiple of $2\pi/L$ where $L$ is the recording wavelength. Accordingly, the Fourier coefficients $\psi_k(y)$ are determined by:

$$\frac{d^2\psi_k(y)}{d_y^2} - k^2\psi_k(y) = 0 \quad \text{for } y > 0 \text{ and } y < -d\text{, and}$$

$$\frac{d^2\psi_k(y)}{dy^2} - k^2\psi_k(y) = 4\pi\rho_k \quad \text{for } 0 < y < -d$$

where $d$ is the thickness of the recording belt 201 in FIG. 2. The magnetic potential is symmetric around the center plane of the recording layer and vanishes at $y = -\infty$. Therefore, $$\begin{aligned} \psi_k(y) &= a_k e^{-|k| y} && \text{for } y>0 \\ &= a_k e^{|k|(y+d)} && \text{for } y<-d \\ &= b_k \cosh k\left(y + \frac{d}{2}\right) - 4\pi\rho_k k^{-2} && \text{for } 0<y<-d \end{aligned}$$

From the boundary condition that $\psi$ is continuous at $y = 0$ and $y = -d$, $a_k$ is found to be:

$$a_k = b_k \cosh (1/2)kd - 4\pi p_k k^{-2}$$

Applying the assumption that there is no magnetization in the $y$ direction:

$$-|k|\, a_k = k b_k \sinh (1/2)kd$$

$\psi$ may then be written for $y > 0$ as:

$$\psi(x,y) = -2\pi \sum_k \rho_k k^{-2}(1 - e^{-|k|d})e^{-|k|y}e^{ikx}$$

Substantial simplification can be obtained if it is assumed that the magnetization $M_x(x)$ varies sinusoidally. This assumption is also useful since transitions between the small recording areas cannot be made simultaneously. For $M_x(x) = M_o \sin k_o x$, $\rho_k = 0$ unless $k = \pm k_o$ and, from the well-known relationship:

$$\rho = -\bar{\nabla}\cdot \bar{M},\ \rho = -\frac{\delta M_x(x)}{\delta x},$$

and $$\rho_{\pm k_o} = -(1/2)M_o k_o.$$

Thus, for $y > 0$:

$$\psi(x,y) = (A/k_o)e^{-k_o y} \cos k_o x$$

where $k_o$ is positive and $A = 2\pi M_o(1-e^{-k_o d})$.

From the gradient of this potential the $x$ and $y$ components of the magnetic field are:

$$H_x = -Ae^{-k_o y} \sin k_o x$$

$$H_y = -Ae^{-k_o y} \cos k_o x$$

where $k_o$ is positive and $A = 2\pi M_o(1-e^{-k_o d})$.

The force per unit volume acting upon a toner particle can be expressed as:

$$\bar{f} = \bar{M} \cdot \bar{\nabla} H$$

(see, for example, W. F. Brown, "Electric and Magnetic Forces: A Direct Calculation I", *American Journal of Physics*, Vol. 19, pages 290–304, August 1951). Since $$\bar{M} = \chi\bar{H} \text{ and } \bar{f} = (1/2)\chi\bar{\nabla}H^2$$

$$f_y = -\chi A^2 k_o e^{-2k_o y}.$$

Thus, for a toner particle with susceptibility $\chi$ and mass density $\rho_M$, the force per unit mass is:

$$-F_y/m = (\chi/\rho_M)(2\pi M_o)^2 k_o(1-e^{-k_o d})^2 p$$

where $P$ is the average of the exponential $e^{-2k_o y}$ over the toner particle volume V such that:

$$P = 1/V \int_V e^{-2k_o y} dV .$$

The total attractive force on the toner particle is dependent upon both of the factors $(1-e^{-k_o d})^2$ and P. The former increases with increasing $k_o$ (decreasing L) while the latter does the opposite. Hence, there is some value of $k_o$ where the attractive force reaches a maximum.

The calculation for $F_y/m$ are performed in the same manner above when the toner particle is not homogeneous but has an inner spherical core of magnetically permeable material surrounded by an outer spherical shell of pigment bearing thermoplastic material. In that case, the same formula may be used but with the susceptibility $\chi$ and mass density $\rho_M$ replaced by volume averaged quantities here designated $<\chi>$ and $<\rho>$. If $V_m$ is the volume of the magnetic material and $V_p$ is the volume of the thermoplastic material where $V_m + V_p = V$ then:

$$<\chi> = \chi(V_m/V), \text{ and}$$

$$<\rho_M> = (\rho_{Mm}V_m + \rho_{Mp}V_p)/V$$

where $\rho_{Mm}$ is the mass density of the magnetically permeable material and $\rho_{Mp}$ is the mass density of the thermoplastic material. Thus:

$$-F_y/m = (<\chi>/<\rho_M>)(2\pi M_o)^2 k_o(1-e^{-k_o d})^2 P.$$

Figure 4:
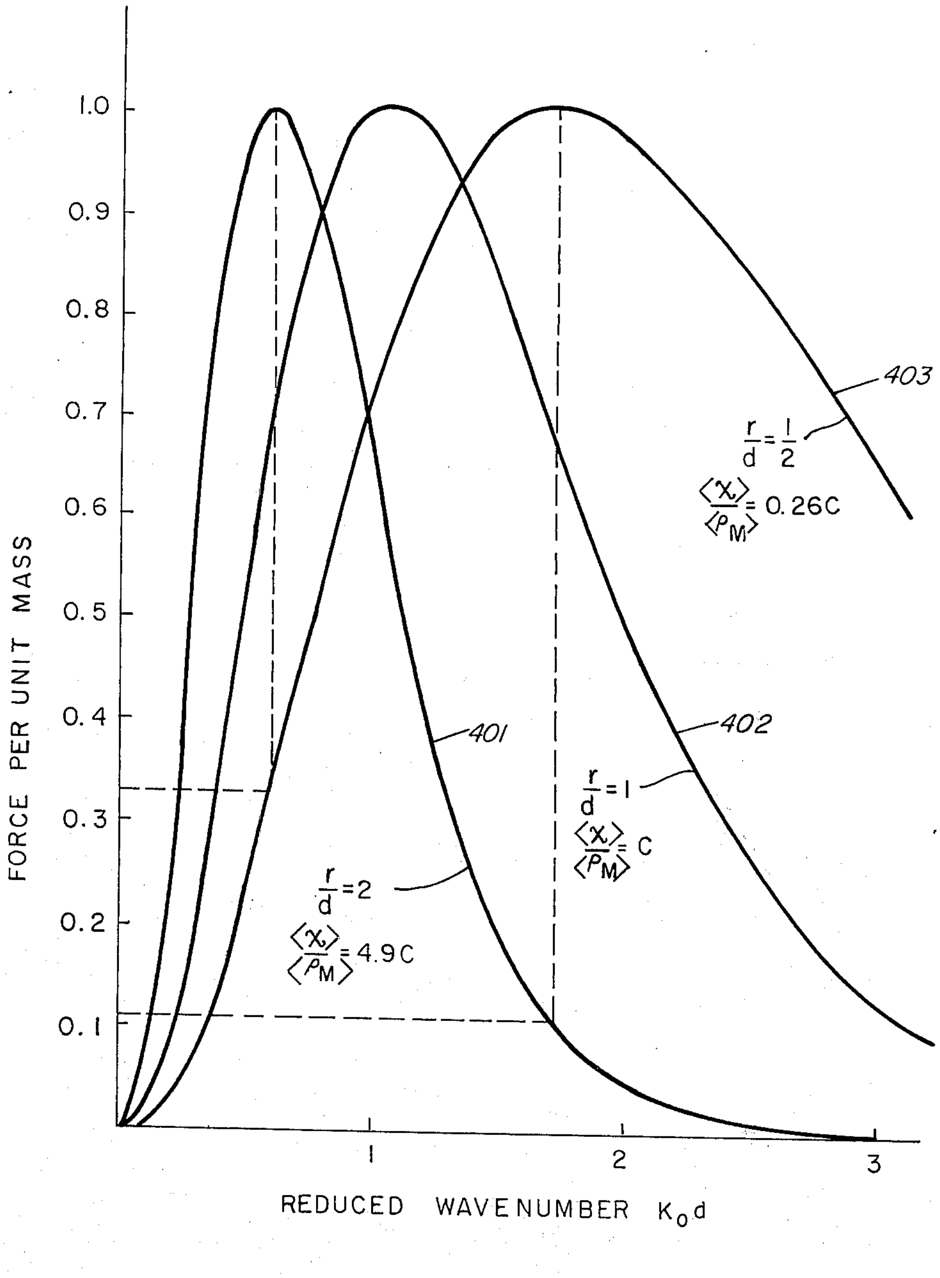
FIG. 4 is a graph showing the force per unit mass on a toner particle as it varies with reduced wavenumber for three different particles.

In FIG. 4 is shown a graph of the above function for three different toner particles with inner cores of magnetically permeable material. The force has been normalized to arbitrary units and the value of the ratio $<\chi>/<\rho_M>$ has been adjusted so that the three curves have equal peak heights. This adjustment is necessary in that the total attractive force per unit mass dereases with decreasing toner particle size. Also, maintaining equal peak heights is important in that the contrast ratio of the toner on paper is dependent to some degree upon the attractive force and it is desirable to maintain substantially equal contrast ratios among the several colors. The $<\chi>/<\rho_M>$ ratio is plotted for an abritrary value $c$ for curve 402. On the $x$ axis is plotted for convenience the reduced wavenumber $k_o d$. For curve 401, the ratio of the radius of the particle $r$ to the thickness $d$ of the recording medium is set at 2 while the susceptibility to mass density ratio is adjusted to 4.9$c$. In curve 402 the radius to thickness ratio is set at 1. Finally, for curve 403, the particle radius to recording layer thickness is ½ while the susceptibility to mass density ratio is adjusted to 0.26$c$. If an area of the recording surface is recorded at the wavelength which corresponds to the peak of curve 401, i.e., when the force is a maximum on the type of toner particles which it is intended be attracted to that particular area, the force on the type of toner particles which are maximally attracted to areas recorded at the wavelength where curve 301 reaches its peak have been reduced to approximately 0.32 times its peak value. Furthermore, at the wavelength where curve 403 reaches its peak, the attractive force on the type of particles with maximum attraction at the wavelength corresponding to the peak of curve 401 has decreased to approximately 0.12 of its peak value. Of course, other curves can be constructed for other types of toner particles, as these curves are by way of illustration only.

Figure 5:
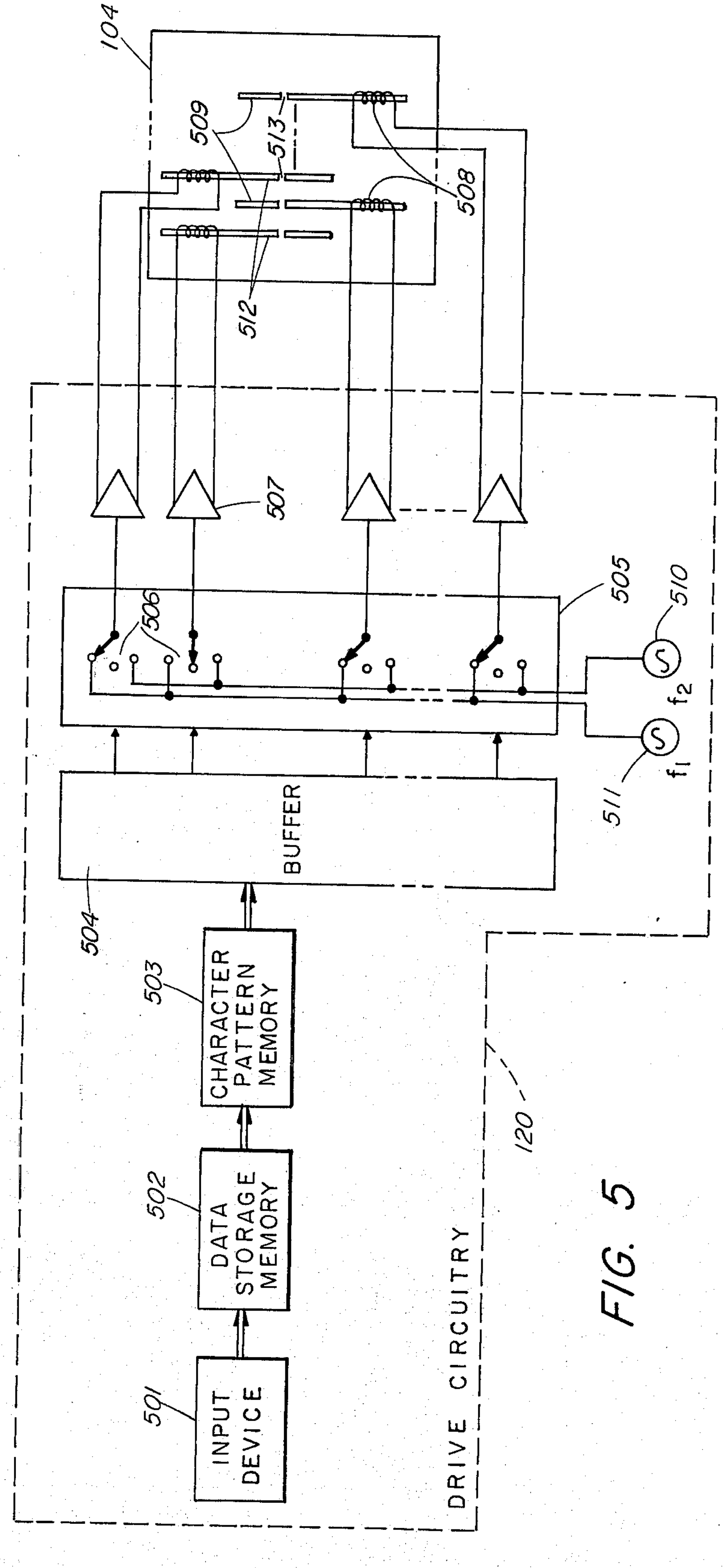
FIG. 5 is a block diagram of the drive circuitry and recording head of the apparatus of FIG. 1.

In FIG. 5 is shown the block diagram of a portion of the drive circuitry 120 and one of the recording heads 104 as was shown in FIG. 1. An input device 501, such as an output buffer of a computer or a receiving buffer in a Teletype, couples codes representing characters or symbols to be printed to data storage memory 502 where these codes are stored prior to being used to cause the patterns and characters to be printed on the paper surface. Character pattern memory 503, which is preferably a read-only memory, converts the character codes to signals representing the character or symbol patterns to be printed. There is one signal for each track in the recording head 104. As the recording tape or medium is moved past the recording head, the signals from character pattern memory 503 will excite all of the tracks simultaneously. Buffer 504 receives the 16 signals from character pattern memory 503 and in accordance with them operates switches 506 of which there may be any number but only four of which are shown in the figure for clarity. Each of switches 506 has three positions. The first position connects the switch to frequency $f_1$ source 511 which is set to have a frequency such that, when taken in consideration with the relative speed of the recording belt, the recording wavelength will be that wavelength which is a peak for a first type of toner particle to be attracted to those areas of the recording belt. The second position of the switch is blank. When the switch is put into that position, the recording belt will be uniformly magnetized making it such that the attractive force between the recording belt and any of the types of toner particles is a minimum. The third position of the switches 506 couples them to frequency $f_2$ source 510 which operates at a frequency such that when taken into account with the speed of the recording belt past the recording head, a second recording wavelength will be roduced which causes a peak attraction for a second type of toner particle. Preferably, all of these switches 506 are electronic switches so that high switching speeds may be achieved. However, they are shown here generically for clarity of illustration. Amplifiers 507 couple the signals from switches 506 to the various tracks of recording head 104. The tracks of the recording head include two pole pieces 509 and 512. These are alternatively long and short pole pieces with a magnetizing coil 508 wound on each of the longer pole pieces 412. The actual magnetic field is generated in gaps 513 across which the recording belt is moved and in which the maximum field strength is generated. The pole pieces extend across the width of the largest character or symbol to be printed.

Although a preferred embodiment of the invention has been described, numerous modifications and alterations thereto would be apparent to one skilled in the art without departing from the spirit and scope of the present invention.

What is claimed is:

1. A color magnetographic printing system comprising in combination:

means for magnetizing a magnetizable surface with a plurality of recording wavelengths; and a plurality of toner types, particles of each of said toner types adhering maximally to areas of said surface magnetized at a predetermined wavelength, each of said toner types corresponding to a predetermined color.

2. The combination of claim 1 wherein said magnetizable surface comprises a magnetizable belt.

3. The combination of claim 1 wherein said magnetizable surface comprises a magnetizable drum.

4. The combination of claim 1 wherein at least some of said toner particles are different colors.

5. The combination of claim 4 wherein at least some of said toner types comprise a plurality of particles, said particles each having a central core of magnetizable material and a shell of non-magnetizable material, said shell surrounding said core.

6. The combination of claim 5 wherein said shell comprises a color bearing thermoplastic material.

7. The combination of claim 6 wherein said magnetizable material is not permanently magnetizable.

8. The combination of claim 4 wherein at least some of said toner types comprise a plurality of particles, said particles being a substantially homogeneous mixture of a magnetizable material and a non-magnetizable material.

9. The combination of claim 8 wherein said non-magnetizable material comprises a color bearing thermoplastic material.

10. The combination of claim 4 wherein said magnetizable surface is magnetized in a plurality of patterns.

11. The combination of claim 10 wherein said patterns represent characters to be printed.

12. The combination of claim 10 wherein said patterns each comprise a plurality of areas within each of which the direction of magnetization of said surface alternates along at least one direction on said surface.

13. The combination of claim 12 wherein the direction of said magnetization is varied in accordance with a recording wavelength.

14. The combination of claim 13 wherein said recording wavelength is varied among at least some of said patterns.

15. The combination of claim 14 wherein the area to which each of said toner types adhere is dependent upon said recording wavelength.

16. The combination of claim 15 wherein said patterns comprise characters to be printed.

17. The combination of claim 16 further comprising:

means for magnetizing said magnetizable surface in said patterns;

means for applying said plurality of toner types to said surface; and means for transferring said toner types from said surface to a paper surface.

18. The combination of claim 17 further comprising means from removing said toner from areas of said surface which have not been magnetized in said patterns.

19. The combination of claim 18 wherein said toner removing means comprises in combination:

ultrasonic transducer means, said transducer means being located in proximity to said surface; and means for randomly deflecting toner particles dislodged from said surface by said ultrasonic transducer means.

20. A color magnetographic printing system comprising in combination:

means for magnetizing a magnetizable surface at a plurality of wavelengths; and a plurality of toner types, particles of each of said toner types adhering maximally to areas of said surface which have been magnetized at a predetermined wavelength specific to that toner type, said predetermined wavelength being different for at least some of said toner types, and each of said toner types corresponding to a predetermined color.

21. The combination of claim 20 wherein at least some of siad toner types are of different colors.

22. The combination of claim 21 wherein at least some of said toner types are of different weights.

23. The combination of claim 21 herein at least some of said toner types are of different magnetic permeability.

24. A color magnetographic printing system comprising in combination:

means for providing a magnetizable surface; and means for magnetizing portions of said surface in a plurality of patterns, each of said patterns comprising magnetized regions of said surface in which the direction of magnetization of said surface is periodically varied at predetermined recording wavelengths, the recording wavelengths varying between at least some of said patterns in accordance with a color with which each of said patterns is to be printed.

25. The combination of claim 24 wherein said magnetizing means comprises:

a plurality of recording heads, each of said heads producing a recording track;

means for selectively coupling each of said recording heads to one of at least two oscillator sources, said sources each having a different frequency; and means for selecting to which of said oscillator sources each of said recording channels is coupled.

26. The combination of claim 25 wherein said selecting means is operated in response to character patterns to be printed.

27. The combination of claim 26 further comprising means for moving said magnetizable surface relative to said recording head.

28. A multicolor magnetographic printing method comprising the steps of:

magnetizing at least some areas of a magnetizable surface with a first recording wavelength;

magnetizing other areas of said magnetizable surface with other recording wavelengths;

applying a plurality of differently colored toner particle types to said magnetizable surface, each one of said toner particle types adhering maximally to areas of said magnetizable surface magnetized with a recording wavelength specific for that toner particle type; and transferring said toner particles in recorded areas from said magnetizable surface to a paper surface.

29. The method of claim 28 further comprising the step of removing toner particles which are not located in a recorded area from said magnetizable surface before transfer is made to said paper.

30. The method of claim 29 further comprising the step of heating said toner particles to at least melting temperature after transfer is made to said paper.

* * * * *

UNITED STATES PATENT OFFICE
CERTIFICATE OF CORRECTION

Patent No. 3,965,478 Dated June 22, 1976

Inventor(s) Ernst F. R. A. Schloemann PAGE 1 of 2

It is certified that error appears in the above-identified patent and that said Letters Patent are hereby corrected as shown below:

Column 4, line 25, change "attract primarily a smaller" to -- and a color --

Column 4, line 37, separate the words "attract" and "primarily"

Column 4, line 38, change "smller" to -- smaller --

Column 4, line 55, insert quotes around the letter "C"

Column 4, line 57, insert quotes around the letter "C"

Column 5, line 27, insert a minus sign between (y) and $k^2$

Column 5, line 28, change "sub y" to -- y --

Column 5, line 29, insert a minus (-) sign between (y) and $k^2$

Column 6, line 24, insert a colon (:) after $H^2$

Column 6, line 26, insert a sub-o between -2k and y

Column 7, line 3, change "dereases" to -- decreases --

Column 8, line 1, change "roduced" to -- produced --

Column 8, line 37, insert the word -- of -- between are & different

UNITED STATES PATENT OFFICE
CERTIFICATE OF CORRECTION

Patent No. 3,965,478 Dated June 22, 1976

Inventor(s) Ernst F. R. A. Schloemann

It is certified that error appears in the above-identified patent and that said Letters Patent are hereby corrected as shown below:

Column 9, line 14, change "from removing" to -- for removing --

Column 9, line 38, change "siad" to -- said --

Column 9, line 41, change "herein" to -- wherein --

Signed and Sealed this

Fourteenth Day of December 1976

[SEAL]

*Attest:*

RUTH C. MASON
*Attesting Officer*

C. MARSHALL DANN
*Commissioner of Patents and Trademarks*